United States Patent [19]

Asada et al.

[11] Patent Number: 5,057,063
[45] Date of Patent: Oct. 15, 1991

[54] AUTOMATIC TRANSMISSION

[75] Inventors: Toshiyuki Asada; Yasuhiko Higashiyama; Yasunori Nakawaki; Toshitake Suzuki; Akiharu Abe; Naoki Moriguchi, all of Susono, Japan

[73] Assignee: Toyota Jidosha Kabushiki Kaisha, Toyota, Japan

[21] Appl. No.: 493,707

[22] Filed: Mar. 15, 1990

[30] Foreign Application Priority Data

Mar. 15, 1989 [JP] Japan .................................... 1-63385
Sep. 12, 1989 [JP] Japan ................................... 1-235968

[51] Int. Cl.$^5$ ............................................. F16H 57/10
[52] U.S. Cl. ................... 475/278; 475/280; 475/281
[58] Field of Search ............... 475/10, 252, 275, 277, 475/278, 280–289, 292, 312, 313, 318, 319, 324, 325, 330

[56] References Cited

U.S. PATENT DOCUMENTS

| | | | |
|---|---|---|---|
| 3,385,134 | 5/1968 | Crooks | 475/281 |
| 3,811,343 | 5/1974 | Mori et al. | |
| 3,863,524 | 2/1975 | Mori et al. | |
| 3,877,320 | 4/1975 | Iijima | 475/280 |
| 3,899,940 | 8/1975 | Iijima | 475/280 |
| 3,946,624 | 3/1976 | Murakami et al. | 475/280 X |
| 4,233,861 | 11/1980 | Gaus et al. | 475/56 |
| 4,660,439 | 4/1987 | Hiraiwa | 475/276 |
| 4,774,856 | 10/1988 | Hiraiwa | |

FOREIGN PATENT DOCUMENTS

| | | |
|---|---|---|
| 0121259 | 10/1984 | European Pat. Off. . |
| 0164553 | 12/1985 | European Pat. Off. . |
| 2751312 | 6/1978 | Fed. Rep. of Germany . |
| 3511180 | 10/1985 | Fed. Rep. of Germany . |
| 51-17767 | 2/1976 | Japan . |
| 51-48062 | 4/1976 | Japan . |
| 51-108168 | 9/1976 | Japan . |
| 51-108170 | 9/1976 | Japan . |
| 51-127968 | 11/1976 | Japan . |
| 52-76570 | 6/1977 | Japan ........................ 475/280 |
| 52-77973 | 6/1977 | Japan ........................ 475/286 |
| 53-74665 | 7/1978 | Japan ........................ 475/280 |
| 53-120045 | 10/1978 | Japan ........................ 475/280 |
| 53-123762 | 10/1978 | Japan ........................ 475/280 |
| 54-132058 | 10/1979 | Japan . |
| 59-26645 | 2/1984 | Japan . |
| 2-26350 | 1/1990 | Japan . |
| 2-72245 | 3/1990 | Japan . |

*Primary Examiner*—Allan D. Herrmann
*Assistant Examiner*—Benjamin Levi
*Attorney, Agent, or Firm*—Cushman, Darby & Cushman

[57] ABSTRACT

A gear train for changing the rotational speed of an input shaft to transmit the resultant rotation to an output shaft consists of single pinion type first and second planetary gear sets and a double pinion type third planetary gear set. A sun gear of the first planetary gear set is normally or selectively connected to a carrier and a sun gear of the second planetary gear set, a carrier of the first planetary gear set is normally or selectively connected to a carrier of the third planetary gear set, the carrier of the second planetary gear set is normally or selectively connected to a sun gear of the third planetary gear set, a ring gear of the second planetary gear set is normally or selectively connected to a ring gear of the third planetary gear set, the input shaft is selectively connected to either one or both of the sun gear and the ring gear of the first planetary gear set, and the output shaft is connected to the sun gear of the third planetary gear set, whereby at least five forward speeds and one reverse are permitted to be set.

30 Claims, 7 Drawing Sheets

AUTOMATIC TRANSMISSION

BACKGROUND OF THE INVENTION

1. Field of the Invention

This invention relates to an automatic transmission for use in a vehicle and, more particularly, to an automatic transmission having a gear train including two single pinion type planetary gear sets and one double pinion type planetary gear set.

2. Description of the Prior Art

The power performance or the fuel consumption of a vehicle as a whole is not necessarily determined only depending on the characteristics of an engine, but largely varies also depending on the characteristics of a transmission. Further, as for the transmission, use has to be made of a transmission which matches to the characteristics of the engine such as to fulfill the characteristics necessary for the vehicle. Hereupon, there has been recently a demand for a compact automatic transmission having many speeds (for example five speeds), in consideration of the demand to provide a high-performance vehicle, or a high-output or high torque engine.

In order to comply with such demand, an automatic transmission disclosed in Japanese Patent Laid-open No. 54-132058 is given as an example of the automatic transmission capable of setting five forward speeds. This automatic transmission is mainly composed of a gear train consisting of one Ravignawx type planetary gear set and one single pinion type planetary gear set, wherein two sun gears and a carrier of the Ravignawx type planetary gear set are selectively connected to an input shaft, and a carrier of the single pinion type planetary gear set is connected to an output shaft.

However, in the above conventional automatic transmission, only one sun gear of the Ravignawx type planetary gear set is connected to the input shaft in the first and second gears, and only the other sun gear is connected to the input shaft in the reverse to set the respective gears, while the sun gear has a smaller diameter in comparison with the carrier and the ring gear, so that the load exerted to the tooth surface of the sun gear in these gears is increased to thereby degrade the strength and the durability. In order to eliminate this disadvantages, it is conceivable that the sun gear is made to increase in diameter. However, since the gear ratio (ratio of number of teeth of sun gear to that of ring gear) of each planetary gear set is determined, the diameter of the sun gear is increased to increase the whole planetary gear set in diameter. Further, in the above conventional automatic transmission, the power circulation takes place in the third forward gear to lower the transmitting efficiency of power, and to degrade the strength and durability. Furthermore, the above automatic transmission needs seven engaging means such as clutches and brakes, which require controlling the engagement and releasing, to thereby bring about the complication of the constitution and the control. Also, even if one predetermined brake means is removed from these seven engaging means, it is possible to set five forward speeds and one reverse. However, in that case, the load torque exerted to the other engaging means (for example, clutch) becomes extremely large.

SUMMARY OF THE INVENTION

An object of the present invention is to provide an automatic transmission provided with a gear train including of two single pinion type planetary gear sets and one double pinion type planetary gear set and capable of setting at least five forward speeds and one reverse.

Another object of the present invention is to provide an automatic transmission which has a small outer diameter and is excellent in durability by lessening the load torque exerted to sun gears of respective planetary gear sets constituting a gear train.

To achieve the above objects, an automatic transmission according to the present invention comprises a gear train including a single pinion type first planetary gear set, a single pinion type second planetary gear set and a double pinion type third planetary gear set, wherein in the gear train, a sun gear of the first planetary gear set is normally or selectively connected to a sun gear of the second planetary gear set, a carrier of the first planetary gear set is normally or selectively connected to a carrier of the third planetary gear set, the carrier of the second planetary gear set is normally or selectively connected to a sun gear of the third planetary gear set, and further a ring gear of the second planetary gear set is normally or selectively connected to a ring gear of the third planetary gear set. The rotation of an input shaft is increased or retarded through the gear train to be transmitted to an output shaft.

Also, the automatic transmission according to the present invention comprises clutch means for selectively connecting the input shaft to a ring gear of the first planetary gear set, another clutch means for selectively connecting the input shaft to the sun gear of the first planetary gear set, further clutch means for selectively connecting the sun gear of the first planetary gear set to the carrier of the second planetary gear set and the sun gear of the third planetary gear set, which are connected to each other, still further clutch means for selectively connecting the sun gear of the first planetary gear set to the sun gear of the second planetary gear set, brake means for selectively stopping the rotation of the sun gear of the second planetary gear set, and another brake means for selectively stopping the rotations of the carrier of the second planetary gear set and the sun gear of the third planetary gear set.

These clutch means and brake means are properly engaged or released to set at least five forward speeds and one reverse. A plurality of kinds of combination patterns of the clutch means and brake means to be engaged are provided to set any gear change stage. Further, the automatic transmission according to the present invention is permitted to accomplish the gear change from any one gear to another gear by changing over either two of the clutch means and brake means. Thus, the clutch means or brake means associated with the gear change has such the constitution including a one-way clutch to thereby perform the gear change which has few shocks and is easy to control.

The above and further objects and features of the present invention will be more apparent from the following detailed description when the same is read in connection with the accompanying drawings. It must be understood, however, that the drawings are for the purpose of illustration only and are not intended as a definition of limits of this invention.

DETAILED DESCRIPTION OF THE PREFERRED EMBODIMENTS

Figure 1:
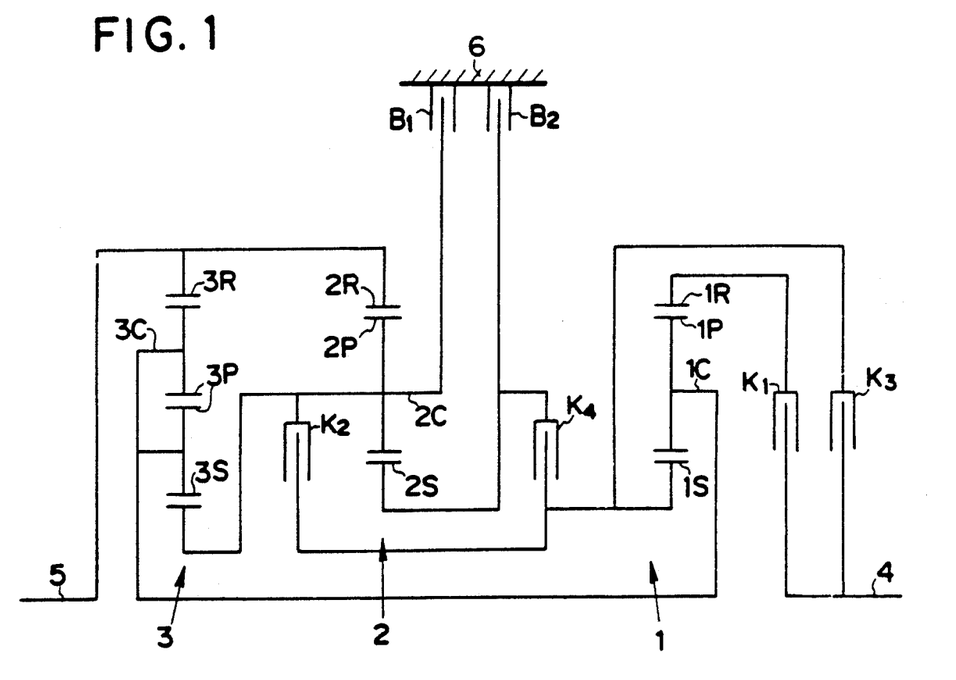
FIGS. 1 through 13 skelton diagrams respectively showing embodiments according to the present invention in principle.

Referring to FIG. 1, among three planetary gear sets constituting a gear train, each of a first planetary gear set 1 and a second planetary gear set 2 is a single pinion type planetary gear set, and a third planetary gear set 3 is a double pinion type planetary gear set. That is, the first planetary gear set 1 has a sun gear 1S, a ring gear 1R disposed to be concentrical with the sun gear 1S and a carrier 1C for holding a pinion gear 1P meshing with these gears 1S, 1R as main components. The second planetary gear set 2, similarly to the first planetary gear set 1, has a sun gear 2S, a ring gear 2R disposed to be concentrical with the sun gear 2S and a carrier 2C for holding a pinion gear 2P meshing with these gears 2S, 2R as main components. On the contrary, the third planetary gear set 3, has a sun gear 3S, a ring gear 3R and a carrier 3C for holding at least a pair of pinion gears 3P disposed between these gears 3S, 3R to mesh with each other as main components. The carrier 1C of the first planetary gear set 1 and the carrier 3C of the third planetary gear set 3 are connected to each other so as to rotate as a single unit, while the carrier 2C of the second planetary gear set 2 and the sun gear 3S of the third planetary gear set 3 are connected to each other so as to rotate as a single unit. Further, the ring gear 2R of the second planetary gear set 2 and the ring gear 3R of the third planetary gear set 3 are connected to each other so as to rotate as a single unit. Also, second clutch means K2 is provided between the sun gear 1S of the first planetary gear set 1 and the carrier 2C of the second planetary gear set 2 and the sun gear 3S of the third planetary gear set 3 to interconnect selectively these sun gears 1S, 3S and the carrier 2C. Further, fourth clutch means K4 is disposed between the sun gear 1S of the first planetary gear set 1 and the sun gear 2S of the second planetary gear set 2 to interconnect selectively these sun gears 1S, 2S.

Further, for the connecting structure of the respective elements as noted above, use is made of a quill shaft, a solid shaft, a proper connecting drum or like connecting structure employed in a general automatic transmission.

An input shaft 4 is connected to an engine (not shown) through power transmitting means (not shown) such as a torque converter and a fluid coupling. First clutch means K1 is provided between the input shaft 4 and the ring gear 1R of the first planetary gear set 1 to interconnect selectively the input shaft 4 and the ring gear 1R, and third clutch means K3 is provided between the input shaft 4 and the sun gear 1S of the first planetary gear set 1 to interconnect selectively the input shaft 4 and the sun gear 1S.

The respective clutch means K1, K2, K3 and K4 generally function to selectively interconnect the respective members or release the interconnection thereof, and are permitted to employ a wet type multi-disc clutch engaged or released by a hydraulic servo system or like system employed generally in the automatic transmission, a one-way clutch or a structure in which the wet type multi-disc clutch and one-way clutch are disposed in series or parallel relationship, if necessary. Further, since the respective constituent members in the practical use are restricted from the view point of the arrangement, it is a matter of course that a proper intermediate member such as a connecting drum is interposed as a connecting member for each of the clutch means K1, K2, K3 and K4.

First brake means B1 for selectively blocking the rotation of the carrier 2C of the second planetary gear set 2 and the sun gear 3S of the third planetary gear set 3, which are connected to each other, is provided between the carrier 2C and the sun gear 3S and a transmission casing (hereinafter will be simply referred to as casing) 6. Also, second brake means B2 for selectively blocking the rotation of the sun gear 2S of the second planetary gear set 2 is provided between the sun gear 2S and the casing 6. For each of these brake means B1, B2, use is made of a band brake or a wet type multi-disc brake driven by a hydraulic servo system or the like generally employed in the automatic transmission, or a one-way clutch, or a combination of these brakes and clutch. Also, in the practical use, it is a matter of course that proper connecting members are respectively interposed between these brake means B1, B2 and the respective elements to be held stationary by these brake means B1, B2 or between these brake means B1, B2 and the casing 6.

An output shaft 5 for transmitting the rotation to a propeller shaft or a counter gear (not shown respectively) is connected to the united ring gears 2R, 3R of the second and third planetary gear sets 2, 3.

The automatic transmission thus constituted as noted above makes the gear change of five forward speeds and one reverse or seven forward speeds and one reverse possible, and the respective gears are achieved by engaging the clutch means K1, K2, K3 and K4 and the brake means B1, B2 as shown on Table 1.

TABLE 1

| | clutch means | | | | brake means | | gear ratio | |
|---|---|---|---|---|---|---|---|---|
| | K1 | K2 | K3 | K4 | B1 | B2 | ($\rho_1 = 0.464, \rho_2 = 0.336, \rho_3 = 0.302$) | |
| 1st | ∘ | X | X | ∘ | ∘ | X | $\dfrac{\rho_1 + \rho_2 + \rho_1 (\rho_2 - \rho_3)}{\rho_2 (1 - \rho_3)}$ | 3.471 |
| 2nd | ∘ | ∘ | X | X | ∘ | X | $(1 + \rho_1)/(1 - \rho_3)$ | 2.094 |
| 3rd | ∘ | X | ∘ | X | ∘ | X | $1/1(1 - \rho_3)$ | 1.433 |
| 4th | ∘* | ∘* | ∘* | ∘* | X | X | 1 | 1.000 |
| 5th | X | ∘ | ∘ | X | X | ∘ | $1/1(1 + \rho_2)$ | 0.749 |
| Rev | X | X | ∘ | ∘ | ∘ | X | $-1/\rho_2$ | $-2.976$ |
| 2.5th | ∘ | X | X | ∘ | X | ∘ | $\dfrac{(1 + \rho_1)(1 + \rho_2 - \rho_3)}{(1 + \rho_2)(1 - \rho_3)}$ | 1.623 |
| 3.5th | ∘ | X | ∘ | X | X | ∘ | $\dfrac{1 + \rho_2 - \rho_3}{(1 + \rho)(1 - \rho_3)}$ | 1.109 |

*At least eigher three clutch means are engaged.

Further, on Table 1, the change gear ratios of the respective gears are shown together with specified values thereof. (Each of the specified values is a value obtained when the gear ratios $\rho_1$, $\rho_2$ and $\rho_3$ of the respective planetary gear sets 1, 2 and 3 are defined as 0.464, 0.336 and 0.302, respectively. Further, on Table 1, the mark ◯ represents the engaged condition and the mark X represents the released condition. Hereinafter will be first described the case of setting five forward speeds and one reverse and then two speeds which can be added thereto.

(First gear)

The carrier 2C of the second planetary gear set 2 and the sun gear 3S of the third planetary gear set 3 are held stationary under the condition that the sun gear 1S of the first planetary gear set 1 is connected to the sun gear 2S of the second planetary gear set 2. Also, the ring gear 1R of the first planetary gear set 1 is connected to the input shaft 4. That is, the first clutch means K1 and the fourth clutch means K4 are engaged, and also the first brake means B2 is engaged. Accordingly, in the first planetary gear set 1, the carrier 1C rotates forward slower than the input shaft 4 (in the same direction as the input shaft 4, and the same shall apply hereinafter), and the sun gear 1S rotates in the reverse direction (in the opposite direction to the input shaft 4, and the same shall apply hereinafter). Further, in the second planetary gear reverse 2, since the sun gear 2S connected to the sun gear 1S of the first planetary gear set 1 rotates in the reverse direction under the condition that the carrier 2C is held stationary, the ring gear 2R is rotated forward largely slower than the input shaft 4. Also, in the third planetary gear set 3, the carrier 3C rotates forward lower than the input shaft 4 together with the carrier 1C of the first planetary gear set 1 under the condition that the sun gear 3S is held stationary, so that the ring gear 3R is rotated forward largely slower than the input shaft 4. That is, the output shaft 5 is rotated forward at a slower speed than that of the input shaft 4 to thereby provide the first speed having the largest change gear ratio in the forward speeds. As shown on Table 1, this change gear ratio is represented as follows:

$$\frac{\rho_1 + \rho_2 + \rho_1(\rho_2 - \rho_3)}{\rho_2(1 - \rho_3)}$$

and the specified value thereof comes to 3.471. In this case, the power circulation does not take place.

(Second gear)

The ring gear 1R of the first planetary gear set 1 is rotated together with the input shaft 4 under the condition that the sun gear 1S of the first planetary gear set 1, the carrier 2C of the second planetary gear set 2 and the sun gear 3S of the third planetary gear set 3 are held stationary. That is, the second clutch means K2 and the first brake means B1 are engaged to hold the sun gear 1S of the first planetary gear set 1, the carrier 2C of the second planetary gear set 2 and the sun gear 3S of the third planetary gear set 3 stationary, while the first clutch means K1 is engaged to connect the ring gear 1R of the first planetary gear set 1 to the input shaft 4. In other words, the second clutch means K2 is engaged instead of the fourth clutch means K4 under the first gear condition. Therefore, in the first planetary gear set 1, since the ring gear 1R rotates together with the input shaft 4 under the condition that the sun gear 1S is held stationary, the carrier 1C is rotated forward slower than the input shaft 4, so that this reduced rotation is transmitted to the carrier 3C of the third planetary gear set 3. Further, in the third planetary gear set 3, since the carrier 3C rotates forward slower than the input shaft 4 under the condition that the sun gear 3S is held stationary, the ring gear 3R is rotated forward slower than the input shaft 4. In this case, the sun gear 2S of the second planetary gear set 2 is in a condition to disconnect from the sun gear 1S of the first planetary gear set 1 and the casing 6, so that the second planetary gear set 2 does not particularly perform the increasing and retarding operations. As a result, the output shaft 5 connected to the ring gears 2R, 3R of the second and third planetary gear sets 2, 3 are rotated forward slower than the input shaft 4 to provide the second forward gear. Thus, as shown on Table 1, the change gear ratio in this case is represented as follows;

$$(1 + \rho_1)/(1 - \rho_3)$$

and the specified value thereof comes to 2.094. The power circulation does not take place also in this case.

(Third gear)

The carrier 3C of the third planetary gear set 3 is rotated forward at the same speed as the input shaft 4 under the condition that the sun gear 3S is held stationary. That is, the first brake means B1 is engaged to hold the carrier 2C of the second planetary gear set 2 and the sun gear 3S of the third planetary gear set 3 stationary, while the first and third clutch means K1, K3 are engaged to connect the ring gear 1R and the sun gear 1S of the first planetary gear set 1 to the input shaft 4. In other words, the third clutch means K3 is engaged instead of the second clutch means K2 under the second gear condition. Therefore, in the first planetary gear set 1, since two components, i.e., the ring gear 1R and the sun gear 1S rotate together with the input shaft 4, the whole first planetary gear set rotates together with the input shaft 4 as a single unit, so that the rotation of the carrier 1C is transmitted to the carrier 3C of the third planetary gear set 3. As a result, in the third planetary gear set 3, since the carrier 3C rotates forward at the same speed as the input shaft 4 under the condition that the sun gear 3S is held stationary, the ring gear 3R is rotated forward slower than the input shaft 4. In this case, similarly to the case in the second forward gear as noted above, since the sun gear 2S is in a condition to disconnect from the sun gear 1S of the first planetary gear set 1 and the casing 6, the second planetary gear set 2 does not particularly perform the increasing and retarding operations. That is, the rotation of the input shaft 4 is substantially reduced only by the third planetary gear set 3 to be transmitted to the output shaft 4. As shown on Table 1, the change gear ratio is represented as follows:

$$1/(1 - \rho_3)$$

and the specified value thereof comes to 1.433. Also, the power circulation does not take place in this case.

(Fourth gear)

The whole gear train is rotated as a single unit. That is, at least three clutch means out of the first through fourth clutch means K1 through K4 are engaged. For example, the first through third clutch means K1 through K3 are engaged to respectively connect the ring gear 1R and the sun gear 1S of the first planetary gear set 1, the sun gear 2S and the carrier 2C of the second planetary gear set 2 and the sun gear 3S of the third planetary gear set 3 to the input shaft 4. In other words, the second clutch means K2 is engaged instead of the first brake means B1 under the third gear condition. In that case, since two elements of each of the first and second planetary gear sets 1, 2 are connected to the input shaft 4, the whole first and second planetary gear sets are rotated together with the input shaft 4. Further, the sun gear 3S of the third planetary gear set 3 is connected to the input shaft 4, and besides, the carrier 3C is rotated forward at the same speed as the input shaft 4 together with the carrier 1C of the first planetary gear set 1, so that the whole first and third planetary gear sets are rotated forward at the same speed as the input shaft 4. That is, since the whole gear train rotates as a single unit together with the input shaft 4, the increasing and retarding operations are not produced and the change gear ratio comes to "1", as a single unit together with the input shaft 4. Therefore, the power circulation becomes impossible to take place even in this case.

(Fifth gear)

The carrier 2C of the second planetary gear set 2 is rotated together with the input shaft 4 under the condition that the sun gear 2S of the second planetary gear set 2 is held stationary. That is, under the condition that the second clutch means K2 is engaged to connect the sun gear 1S of the first planetary gear set 1 to the carrier 2C of the second planetary gear set 2 and the sun gear 3S of the third planetary gear set 3, the third clutch means K3 is engaged to connect the input shaft 4 to the carrier 2C of the second planetary gear set 2, and the sun gear 2S of the second planetary gear set 2 is held stationary by the second brake means B2. In other words, under the fourth gear condition that the first through third clutch means K1 through K3 are engaged, the second brake means B2 is engaged instead of the first clutch means K1. Therefore, since the ring gear 1R of the first planetary gear set 1 is in a condition to disconnect from the input shaft 4, the first planetary gear set 1 does not particularly perform the increasing and retarding operations. Further, since the carrier 3C of the third planetary gear set 3 is also connected to the carrier 1C of the first planetary gear set 1, the third planetary gear set 3 does not particularly perform the increasing and retarding operations. Also, in the second planetary gear set 2, since the carrier 2C rotates together with the input shaft 4 under the condition that the sun gear 2S is held stationary, the ring gear 2R is rotated forward faster than the input shaft 4. Therefore, the rotation of the input shaft 4 is substantially increased only by the second planetary gear set 2 to be transmitted to the output shaft 5 to thereby provide the fifth gear serving as the overdrive speed. As shown on Table 1, the change gear ratio is represented as follows:

$$1/(1+\rho_2)$$

and the specified value thereof comes to 0.749. Also, the power circulation does not take place in this case.

(Reverse)

The sun gear 2S of the second planetary gear set 2 is rotated together with the input shaft 4 under the condition that the carrier 2C of the second planetary gear set 2 is held stationary. That is, under the condition that the fourth clutch means K4 is engaged to connect the sun gear 1S of the first planetary gear set 1 to the sun gear 2S of the second planetary (ear set 2, the third clutch means K3 is engaged to connect the first planetary gear set 1 and the sun gear 2S of the second planetary gear set 2 to the input shaft 4, while the carrier 2C of the second planetary gear set 2 is held stationary by the first brake means B1. Even in this case, similarly to the case in the fifth gear as noted above, the ring gear 1R of the first planetary gear set 1 is in a condition to disconnect from the input shaft 4, the first and third planetary (ear sets 1, 3 do not particularly perform the increasing and retarding operations. Then, in the second planetary gear set 2, since the sun gear 2S rotates together with the input shaft 4 under the condition that the carrier 2C is held stationary, the ring gear 2R is rotated in the reverse direction. Therefore, also in this case, only the second planetary gear set 2 substantially perform the retarding operation, and the rotation of the input shaft 4 is reversed and retarded to be transmitted to the output shaft 5. As shown on Table 1, the charge gear ratio in this case is represented as follows:

$$-1/\rho_2$$

and the specified value thereof comes to $-2.981$. Further, the power circulation does not take place even in this case.

As is apparent from the description on each of first to fifth gears and reverse, in the automatic transmission shown in FIG. 1, there is no possibility that the input torque is exerted to only one of the sun gears in either of gears, so that the sun gear does not need to be increased in diameter for holding the strength thereof to provide the compact automatic transmission as a whole. Also, since the load torque with respect to the small-diameter sun gear is reduced to thereby provide the automatic transmission advantageous in strength and durability. Further, two engaging means will suffice for the engaging means to be controlled in gear change, and the power circulation does not take place in each gear, the automatic transmission as noted above becomes excellent in easiness of control, power performance, transmission efficiency of power and reduction of shocks in gear change. Particularly, in the automatic transmission as noted above, the second clutch means K2 acts as a brake for holding the sun gear 1S of the first planetary gear set 1 stationary in the second gear, and also acts as a clutch for connecting the carrier 2C of the second planetary gear set 2 to the input shaft 4 in the fourth and fifth gears, so that the required number of engaging means such as a brake and a clutch is reduced to simplify the constitution of the above automatic transmission. Further, since the relative rotational frequency of the pinion gear 1P to the carrier 1C of the first planetary gear set 1 and the rotational frequency of the ring gear 1R are reduced in the fifth gear which is high in frequency for use, with the fact that the fifth gear uses the carrier 2C of the second planetary gear set 2 as the input element through the sun gear 1S of the first planetary gear set 1, the durability of the whole first planetary gear set 1 including the bearing, the pinion gear and the ring gear itself is improved. Furthermore, in the above automatic transmission, since the gear ratio of each of the planetary gear sets 1, 2 and 3 is possible to be set as a proper value, the change gear ratio of each gear becomes to be approximately relevant to the geometric series, the rotational frequency of each element and the relative rotational frequency of the pinion gear to the carrier are reduced, and the load torque exerted to the engaging element is lessened, the compact automatic transmission is provided as a whole, and the durability thereof is improved.

Also, in the embodiment shown in FIG. 1, it is possible to set other two gears, in addition to the above-mentioned gears. Each value of the change gear ratios of these two gears is defined as a value between the second gear and the third gear and a value between the third gear and the fourth gear. These values are represented as the 2.5th gear and the 3.5th gear as shown on the lower stage of Table 1.

(2.5th gear)

This gear corresponds to the gear between the second gear and the third gear, and the first and fourth clutch means K1 and K4 and the second brake means B2 are engaged. Thus, the sun gear 1S of the first planetary gear set 1 is connected to the sun gear 2S of the second planetary gear set 2, which is held stationary by the second brake means B2, through the fourth clutch means K4 to be held stationary. As a result, in the first planetary gear set 1, the ring gear 1R rotates together with the input shaft 4 under the condition that the sun gear 1S is held stationary, and the carrier 1C rotates forward slower than the input shaft 4. Further, in the third planetary gear set 3, the carrier 3C connected to the carrier 1C of the first planetary gear set 1 rotates forward slower than the input shaft 4, while the sun gear 3S rotates forward slower than the carrier 3C since a load from the output shaft 5 is exerted to the ring gear 3R. Further, in the second planetary gear set 2, the carrier 2C connected to the sun gear 3S of the third planetary gear set 3 rotates forward slower than the carrier 3C of the third planetary gear set 3, and the sun gear 2S is held stationary, so that the ring gear 2R is rotated forward faster than the carrier 2C. Thus, in the third planetary gear set 3, the ring gear 3R rotates forward at an intermediate speed between that of the carrier 3C and that of the sun gear 3S. Consequently, in this case, the first through third planetary gear sets 1, 2 and 3 perform the retarding operation as a whole, so that the rotation of the input shaft 4 is retarded to be transmitted to the output shaft 5. As shown on Table 1, the value of the change gear ratio is represented as follows:

$$\frac{(1 + \rho_1)(1 + \rho_2 - \rho_3)}{(1 + \rho_2)(1 - \rho_3)}$$

and the specified value thereof comes to 1.623.

(3.5th gear)

This gear corresponds to the gear between the third gear and the fourth gear, and the first and third clutch means K1, K3 and the second brake means B2 are applied. That is, since two elements of the first planetary gear set 1 are connected to the input shaft 4, the whole first planetary gear set 1 rotates together with the input shaft 4 as a single unit, so that the carrier 3C of the first planetary gear set 3 connected to the carrier 1C of the first planetary gear set 1 is rotated forward at the same speed as the input shaft 4. The connection between the elements of the third planetary gear set 3 and those of the second planetary gear set 2 is similar to that in the case of the 2.5th gear. Therefore, in the third planetary gear set 3, the sun gear 3S rotates forward slower than the carrier 3C, and this rotation is transmitted to the carrier 2C of the second planetary gear set 2. Further, the sun gear 2S of the second planetary gear set 2 is held stationary, so that the ring gear 2R is rotated forward faster than the carrier 2C. Thus, in the third planetary gear set 3, the ring gear 3R rotates forward at the speed between that of the sun gear 3S and that of the carrier 3C. As a result, the output shaft 5 is rotated forward slower than the input shaft 4 by the second and third planetary gear sets 2, 3. Hence, as shown on Table 1, the change gear ratio is represented as follows:

$$(1+\rho_2-\rho_3)/(1+\rho_2)(1-\rho_3)$$

and the specified value thereof comes to 1.109.

Figure 2:
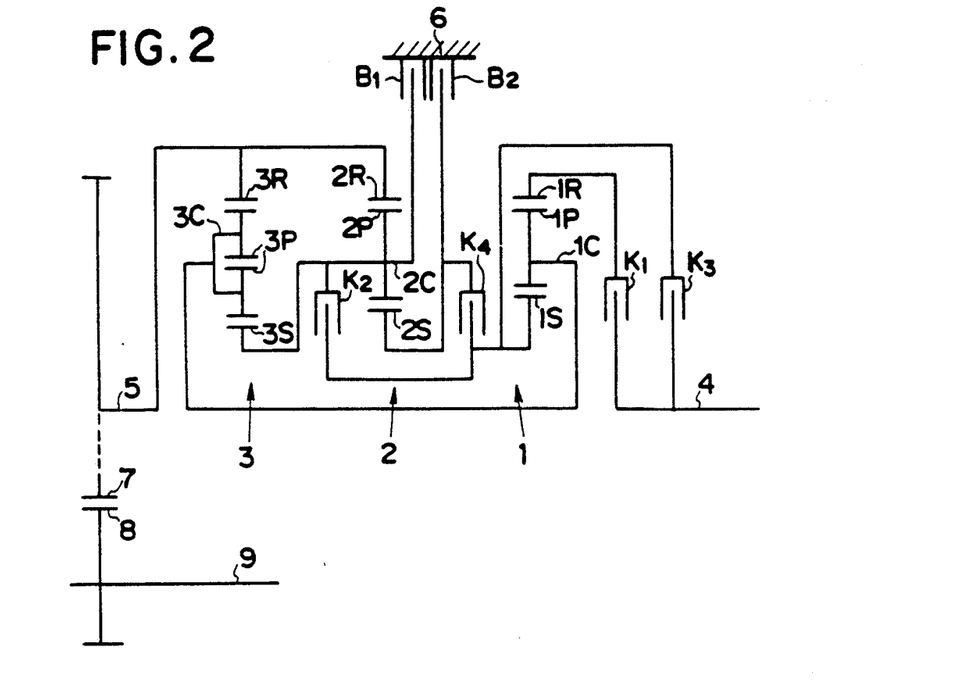
Figure 3:
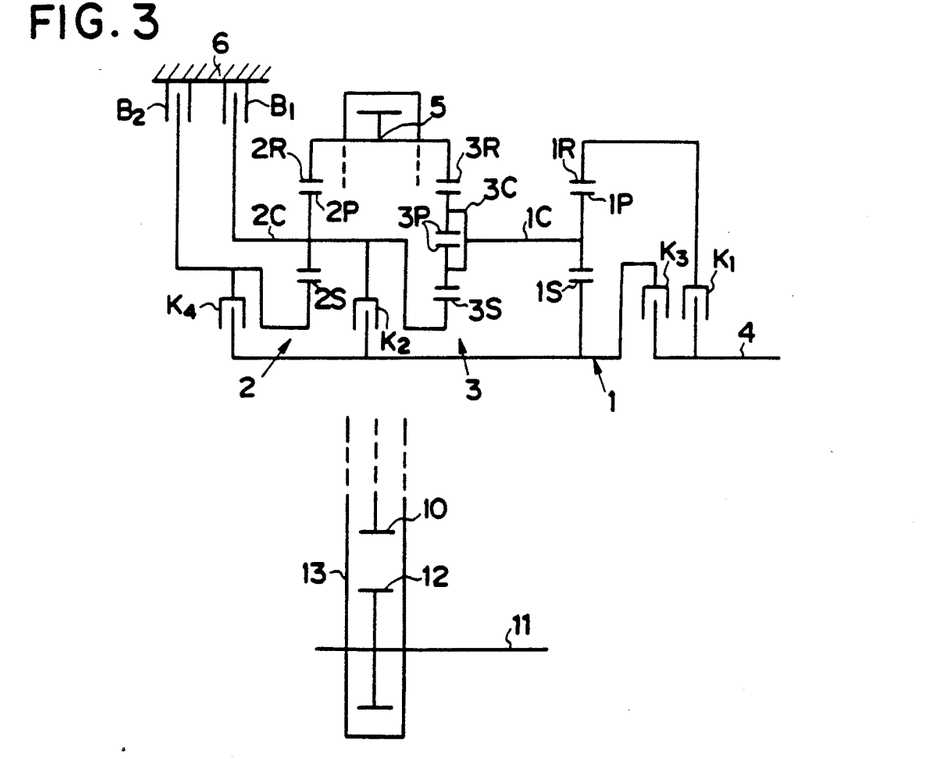

Now, in the embodiment shown in FIG. 1, while the input shaft 4 and the output shaft 5 are disposed on the same axis to be mainly suitable for a FR car (front engine rear drive car), the present invention is not limited to the above embodiment to be capable of applying to a FF car (front engine front drive car), as shown in FIGS. 2 and 3. The embodiment shown in FIG. 2 is so constituted that the output shaft 5 disposed on the same axis as the input shaft 4 is connected to a counter shaft 9 through a counter drive gear 7 and a counter driven gear 8. Also, the embodiment shown in FIG. 3 is so constituted that the respective planetary gear sets are arranged in the order of the first, third and second planetary gear sets 1, 3 and 2 from the side of the input shaft 4, a cylindrical shaft connecting the ring gear 2R of the second planetary gear set 2 to the ring gear 3R of the third planetary gear set 3 is used as the output shaft 5, a drive sprocket 10 is mounted on the output shaft 5, a drive sprocket 12 is mounted on a counter shaft 11 disposed in parallel to the input shaft 4, and these sprockets 11, 12 are connected to each other through a chain 13. Further, in the embodiment shown in FIG. 3, the second brake means B2 is placed on the shaft end at the side opposite to the input shaft 4, and besides, the second brake means B2 is engaged only in the fifth gear, so that the second brake means B2 is removed to be capable of easily modifying into an automatic transmission for setting the four forward speeds and one reverse, while the shaft length thereof may be shortened.

While the respective embodiments as noted above employ six engaging means consisting of the first through fourth clutch means K1 through K4, and the first and second brake means B1, B2 in total, other engaging means may be added to the above six engaging means according to the present invention, as shown ;n the following embodiments. Further, in the following embodiments, the arrangement of the respective planetary gear sets 1, 2 and 3, the input shaft 4 and the output shaft 5 is shown in inverse relation to that in the above mentioned embodiments.

Figure 4:
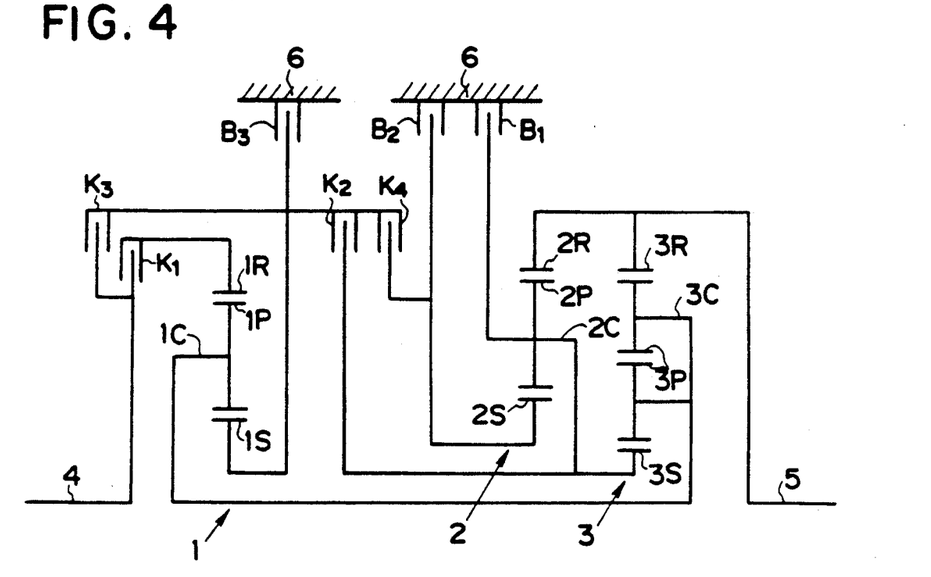

The embodiment shown in FIG. 4 is similar to that in FIG. 1, except that third brake means B3 for holding the sun gear 1S of the first planetary gear set 1 stationary is provided between the sun gear 1S and the casing 6. Even in the embodiment shown in FIG. 4, it is possible to set five through seven forward speeds and one reverse. Table 2 shows the combination of application and releasing of the respective engaging means for setting the respective speeds together. On Table 2 and Tables 3 through 5 which will be later described, the mark ○ represents the engaged condition, the blank represents the released condition and the mark * represents that the pertinent engaging means may be engaged.

TABLE 2

|  | clutch means | | | | brake means | | |
|---|---|---|---|---|---|---|---|
|  | K1 | K2 | K3 | K4 | B1 | B2 | B3 |
| 1st | ○ |  |  | ○ | ○ | ○ |  |
| 2nd | ○ | ○ |  |  | ○ |  | * |
|  | ○ | ○ |  |  | * |  | ○ |
| 3rd | ○ | * |  | ○ |  | ○ |  |
| 4th | ○ |  | ○ | * |  |  |  |
|  | ○ | ○ | * | ○ |  |  |  |

TABLE 2-continued

| | clutch means | | | | brake means | | |
|---|---|---|---|---|---|---|---|
| | K1 | K2 | K3 | K4 | B1 | B2 | B3 |
| 5th | ○ | * | ○ | ○ | | | |
| | * | ○ | ○ | ○ | | | |
| Rev | | ○ | | ○ | ○ | ○ | |
| 2.5th | ○ | | | ○ | | ○ | * |
| | ○ | | | ○ | | * | ○ |
| | ○ | | | ○ | | ○ | ○ |
| 3.5th | ○ | | ○ | | | ○ | |

Figure 5:
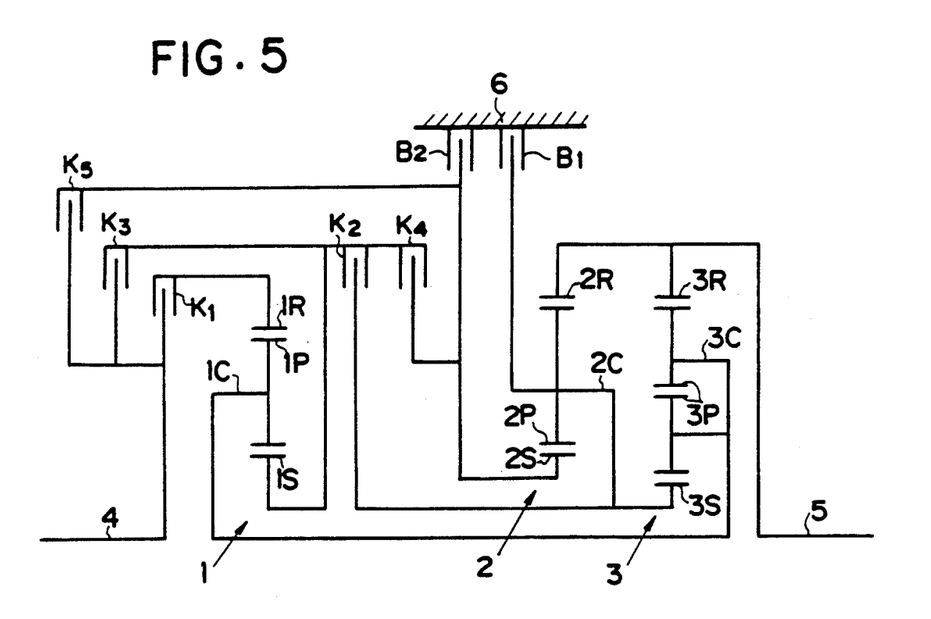

The embodiment shown in FIG. 5 is similar to that shown in FIG. 1, except that fifth clutch means K5 selectively connecting the input shaft 4 to the sun gear 2S of the second planetary gear set 2 is provided. Even in the embodiment shown in FIG. 5, it is possible to set five through seven forward speeds and one reverse. Table 3 shows the combination of engagement and releasing of the respective engaging means for setting the respective gears together.

TABLE 3

| | clutch means | | | | | brake means | |
|---|---|---|---|---|---|---|---|
| | K1 | K2 | K3 | K4 | K5 | B1 | B2 |
| 1st | ○ | | | ○ | | ○ | |
| 2nd | ○ | ○ | | | | ○ | |
| 3rd | ○ | | ○ | | | ○ | |
| 4th | ○ | ○ | ○ | * | * | | |
| | ○ | ○ | * | ○ | * | | |
| | ○ | ○ | * | * | ○ | | |
| | ○ | * | ○ | ○ | * | | |
| | ○ | * | ○ | * | ○ | | |
| | ○ | * | * | ○ | ○ | | |
| | * | ○ | ○ | ○ | * | | |
| | * | ○ | ○ | * | ○ | | |
| | * | ○ | * | ○ | ○ | | |
| | * | * | ○ | ○ | ○ | | |
| 5th | | | ○ | ○ | | | ○ |
| Rev | * | | | | ○ | ○ | |
| | | * | | | ○ | ○ | |
| | | | ○ | | ○ | ○ | |
| | | | | ○ | ○ | ○ | |
| 2.5th | ○ | | ○ | | | | ○ |
| 3.5th | ○ | | | ○ | | | ○ |

As shown in Table 3, in the embodiment shown in FIG. 5, the reverse is set by engaging the fifth clutch means K5 and the first brake means B1. In this case, since the sun gear 1S of the first planetary gear set 1 is held stationary by engaged the second clutch means K2 together with the fifth clutch means K5 and the first brake means B1, the rotational frequency of the ring gear 1R of the first planetary gear set 1 is reduced. Thus, with the reduction of the rotational frequency of the ring gear 1R, the loss of power or the rise of oil temperature is prevented, and the noise is reduced.

Figure 6:
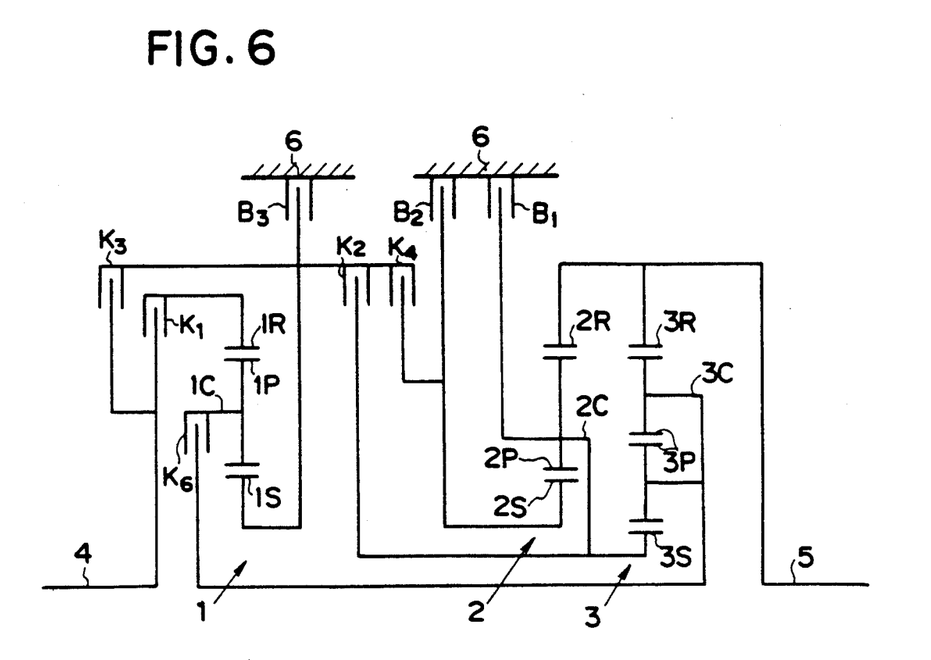

The embodiment shown in FIG. 6 is similar to that shown in FIG. 4, except that six clutch means K6 selectively connecting the carrier 1C of the first planetary gear set 1 and the carrier 3C of the third planetary gear set 3 is interposed between the carrier 1C and the carrier 3C. Table 4 shows the available combination of engagement and releasing of the respective engaging means.

TABLE 4

| | clutch means | | | | | brake means | | |
|---|---|---|---|---|---|---|---|---|
| | K1 | K2 | K3 | K4 | K6 | B1 | B2 | B3 |
| 1st | ○ | | | ○ | | ○ | ○ | |
| 2nd | ○ | ○ | | | | ○ | ○ | * |
| 3rd | ○ | ○ | | | ○ | * | ○ | ○ |
| 4th | ○ | * | ○ | | ○ | ○ | * | |
| | ○ | ○ | ○ | * | ○ | | | |
| | ○ | ○ | * | ○ | ○ | | | |
| | * | ○ | ○ | ○ | ○ | | | |
| 5th | * | ○ | ○ | | | | ○ | |
| | | ○ | ○ | | * | | ○ | |
| Rev | * | | | | ○ | ○ | | |
| | | * | | | ○ | ○ | | |
| 2.5th | ○ | | | ○ | ○ | | ○ | * |
| | ○ | | | ○ | ○ | | * | ○ |
| 3.5th | ○ | | ○ | | ○ | | | ○ |

In the embodiment shown in FIG. 6, it is possible to set the fifth forward gear serving as the overdrive by engaging the second and third clutch means K2, K3 and the second brake means B2, or engaging the first clutch means K1 together with the second and third clutch means K2, K3 and the second brake means B2. By so doing, in the first planetary gear set 1, the sun gear 1S and the ring gear 1R are connected to the input shaft 4 to rotate the whole as a single unit, so that the relative rotation of the respective elements to each other in the first planetary gear set 1 is eliminated. Thus, with the elimination of such relative rotation, the loss of power or the rise of oil temperature is prevented, and the noise is reduced.

Figure 7:
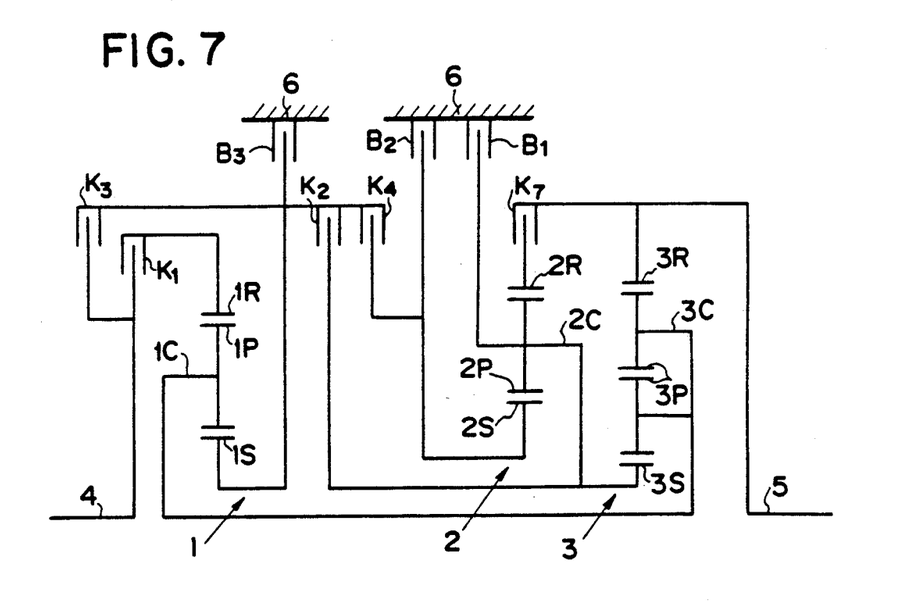

The embodiment shown in FIG. 7 is similar to that shown in FIG. 4, except that seventh clutch means K7 selectively connecting the ring gear 2R of the second planetary gear set 2 to the ring gear 3R of the third planetary gear set 3 is provided. Even in the embodiment shown in FIG. 7, it is possible to set five through seven forward speeds and one reverse. Table 5 shows the available combination of engagement and releasing of the respective engaging means.

TABLE 5

| | clutch means | | | | | brake means | | |
|---|---|---|---|---|---|---|---|---|
| | K1 | K2 | K3 | K4 | K7 | B1 | B2 | B3 |
| 1st | ○ | | | ○ | ○ | ○ | | * |
| 2nd | ○ | ○ | | | * | ○ | | * |
| | ○ | ○ | | | * | ○ | * | ○ |
| | ○ | * | | | ○ | ○ | * | * |
| | * | ○ | | | ○ | ○ | * | ○ |
| 3rd | ○ | | ○ | | | ○ | * | |
| | ○ | | ○ | | * | ○ | | |
| 4th | ○ | | ○ | * | ○ | ○ | | |
| | ○ | ○ | * | ○ | ○ | | | |
| | * | ○ | ○ | ○ | | | | |
| 5th | | | ○ | ○ | | | ○ | |
| Rev | | | | | ○ | ○ | ○ | |
| 2.5th | ○ | | | ○ | ○ | | ○ | * |
| | ○ | | | ○ | ○ | | * | ○ |
| 3.5th | ○ | | ○ | | ○ | | | ○ |

Since the embodiment shown in FIG. 7 is provided with the seventh clutch means K7, the second planetary gear set 2 is made to be independent of the other planetary gear sets 1, 3, so that the second and third gears are set by the retarding operations of the first and third planetary gear sets 1, 3. If the seventh clutch means K7 is released, and the first and second brake means B1, B2 are engaged in the second and third gears, the whole second planetary gear set 2 is held stationary, so that the loss of power or the rise of oil temperature is prevented, and the noise is reduced.

Now, in the respective embodiments as noted above, each of the clutch means K1 through K7 and each of the brake means 81 through B3 are represented by the symbol of a multi-disc clutch or a multi-disc brake. However, according to the present invention, engaging means having one-way property is possible to be used for the clutch means and the brake means in order to facilitate the control for gear change or to damp the shocks. The engaging means having one-way property described herein includes a well known one-way clutch provided with rollers such as sprags or a band brake varying the torque capacity depending on the direction of applying a load. The one-way engaging means of this type is simply used or it is used together with the multi-disc clutch or the multi-disc brake to thereby reduce the number of engaging means to be controlled the change-over of the engaged and released conditions when gear change is made, or to automatically change over the engaged and released conditions with a change of load torque, so that the shocks are reduced. To generate such the operation the elements connected to each other through the one-way engaging means are necessary to rotate in the same direction (including the stationary condition) immediately before the gear change is made, and to rotate relative to each other after the gear change is made while the elements for performing the connecting operation are necessary to be associated with the transmission of torque before the gear change is made. Further, the one-way engaging means may be interposed between two elements connected to each other through the other element performing the same rotation before the gear change is made, in addition to a portion between two element directly connected to each other through the one-way engaging means. Hereinafter will be illustratively explained the position, in which the one-way engaging means is provided, respectively.

Referring to the gear change between the first gear and the second gear, the one-way engaging means such as the one-way clutch is permitted to be interposed between the sun gear 1S of the first planetary gear set 1 and the sun gear 2S of the second planetary gear set 2. Referring to the gear change between the first gear and the 2.5th gear, the one-way engaging means is permitted to be provided at least in one position either between the carrier 2C of the second planetary gear set 2 and the casing 6 or between the sun gear 3S of the third planetary gear set 3 and the casing 6. Referring to the gear change between the first gear and the third gear, the one-way engaging means is permitted to be provided between the sun gear 1S of the first planetary gear set 1 and the sun gear 2S of the second planetary gear set 2. Referring to the gear change between the first gear and the 3.5th gear, the one-way engaging means is permitted to be interposed at least in one position either between the sun gear 1S of the first planetary gear set 1 and the sun gear 2S of the second planetary gear set 2, between the carrier 2C of the second planetary gear set 2 and the casing 6 or between the sun gear 3S of the third planetary gear set 3 and the casing 6. Further, in this case, there is the gear change pattern needing the performance of the gear change by simultaneously changing over at least three engaging means. Referring to the gear change between the first gear and the fourth gear, the one-way engaging means is permitted to be interposed at least in one position either between the carrier 2C of the second planetary gear set 2 and the casing 6 or between the sun gear 3S of the third planetary gear set 3 and the casing 6. Referring to the gear change between the first gear and the fifth gear the one-way engaging means is permitted to be interposed at least in one position either between the sun gear 1S of the first planetary gear set 1 and the sun gear 2S of the second planetary gear set 2, between the carrier 2C of the second planetary gear set 2 and the casing 6, between the sun gear 3S of the third planetary gear set 3 and the casing 6 or between the ring gear 1R of the first planetary gear set 1 and the input shaft 4. Further, in this case, there is also the gear change pattern needing the gear change effected by simultaneously changing over at least three engaging means.

Referring to the gear change between the second gear and the 2.5th gear, the one-way engaging means is permitted to be interposed at least in one position either between the sun gear 1S of the first planetary gear set 1 and the sun gear 3S of the third planetary gear set 3 or between the sun gear 3S of the third planetary gear set 3 and the casing 6. Referring to the gear change between the second gear and the third gear, the one-way engaging means is permitted to be interposed at least in one position either between the sun gear 1S of the first planetary gear set 1 and the sun gear 3S of the third planetary gear set 3 or between the sun gear 1S of the first planetary gear set 1 and the casing 6. Referring to the gear change between the second gear and the 3.5th gear, the one-way engaging means is permitted to be interposed at least in one position either between the sun gear 1S of the first planetary gear set 1 and the sun gear 3S of the third planetary gear set 3, between the sun gear 1S of the first planetary gear set 1 and the casing 6 or between the sun gear 3S of the third planetary gear set set 3 and the casing 6. In this case, there is the gear change pattern needing the gear change performed by changing over simultaneously at least three engaging means. Referring to the gear change between the second gear and the fourth gear, the one-way engaging means is permitted to be interposed at least in one position either between the sun gear 1S of the first planetary gear set 1 and the casing 6 or between the sun gear 3S of the third planetary gear set 3 and the casing 6. Referring to the gear change between the second gear and the fifth gear, the one-way engaging means is permitted to be interposed at least in one position either between the sun gear 1S of the first planetary gear set 1 and the casing 6, between the sun gear 3S of the third planetary gear set 3 and the casing 6 or between the ring gear 1R of the first planetary gear set 1 and the input shaft 4. In this case, there is the gear change pattern needing the gear change performed by simultaneously changing over at least three engaging means.

Referring to the gear change between the 2.5th gear and the third gear, the one-way engaging means is permitted to be interposed at least in one position either between the sun gear 1S of the first planetary gear set 1 and the sun gear 2S of the second planetary gear set 2, between the sun gear 1S of the first planetary gear set 1 and the casing 6 or between the sun gear 2S of the second planetary gear set 2 and the casing 6. In this case, there is the gear change pattern needing the gear change performed by simultaneously changing over at least three engaging means. Referring to the gear change between the 2.5th gear and the 3.5th gear, the one-way engaging means is permitted to be interposed at least in one position either between the sun gear 1S of the first planetary gear set 1 and the sun gear 2S of the second planetary gear set 2 or the casing 6. Referring to the gear change between the 2.5th gear and the fourth gear, the one-way engaging means is permitted to be interposed at least in a position either between the sun gear 1S of the first planetary gear set 1 and the casing 6, between the sun gear 2S of the second planetary gear set 2 and the casing 6. Referring to the gear change between the 2.5th gear and the fifth gear, the one-way engaging means is permitted to be interposed at least in one position either between the sun gear 1S of the first planetary gear set 1 and the sun gear 2S of the second planetary gear set 2 or the casing 6 or between the ring gear 1R of the first planetary gear set 1 and the input shaft 4. In this case, there is the gear change pattern needing the gear change performed by simultaneously changing over at least three engaging means.

Referring to the gear change between the third gear and the 3.5th gear and the gear change between the third gear and the fourth gear respectively, the one-way engaging means is permitted to be interposed between the sun gear 3S of the third planetary gear set 3 and the casing 6. Referring to the gear change between the third gear and the fifth gear, the one-way engaging means is permitted to be interposed at least in one position either between the sun gear 3S of the third planetary gear set 3 and the casing 6, between the sun gear 1S of the first planetary gear set 1 and the carrier 1C or the ring gear 1R of the first planetary gear set 1 or the carrier 3C of the third planetary gear set 3, or between the input shaft 4 and the carrier 1C or the ring gear 1R of the first planetary gear set 1 or the carrier 3C of the third planetary gear set 3. In this case, there is also the gear change pattern needing the gear change performed by simultaneously changing over at least three engaging means.

Referring to the gear change between the 3.5th gear and the fourth gear, the one-way engaging means is permitted to be interposed between the sun gear 2S of the second planetary gear set 2 and the casing 6. Referring to the gear change between the 3.5th gear and the fifth gear, the one-way engaging means is permitted to be interposed at least in one position either between the sun gear 1S of the first planetary gear set 1 and the carrier 1C or the ring gear 1R of the first planetary gear set 1 or the carrier 3C of the third planetary gear set 3 or between the input shaft 4 and the carrier 1C or the ring gear 1R of the first planetary gear set 1 or the carrier 3C of the third planetary gear set 3.

Referring to the gear change between the fourth gear and the fifth gear, since the whole gear train rotates as a single unit in the fourth gear, the one-way engaging means is provided for each of three elements of the respective planetary gear sets 1, 2, 3. That is, referring to the sun gear 1S of the first planetary gear set 1, the one-way engaging means is permitted to be interposed between the sun gear 1S of the first planetary gear set 1 and either one of the ring gear 1R and carrier 1C of the first planetary gear set 1, or the sun gear 2S and ring gear 2R of the second planetary gear set 2 or the carrier 3C and ring gear 3R of the third planetary gear set 3. Referring to the carrier 1C of the first planetary gear set 1, the one way engaging means is permitted to be interposed between the carrier 1C and any other element (including the input shaft 4) except the casing 6, the ring gear 2R of the second planetary gear set 2 and the carrier 3C of the third planetary gear set 3. Referring to the ring gear 1R of the first planetary gear set 1 and the sun gear 2S of the second planetary gear set 2 respectively, the one-way engaging means is permitted to be interposed between the ring gear 1R and the sun gear 2S and any other element (including the input shaft 4) except the casing 6. Referring to the carrier 2C of the second planetary gear set 2, the one-way engaging means is permitted to be interposed either between the carrier 2C and either one of the carrier 1C and ring gear 1R of the first planetary gear set 1, or the sun gear 2S and ring gear 2R of the second planetary gear set 2, or the carrier 3C and ring gear 3R of the third planetary gear set 3. Referring to the ring gear 2R of the second planetary gear set 2, the one-way engaging means is permitted to be interposed between the ring gear 2R and any other element (including the input shaft 4) except the casing 6, the carrier 1C of the first planetary gear set 1 and the carrier 3C of the third planetary gear set 3. Referring to the sun gear 3S of the third planetary gear set 3, the one-way engaging means is permitted to be interposed between the sun gear 3R and either one of the carrier 1C and ring gear 1R of the first planetary gear set 1, or the sun gear 2S and ring gear 2R of the second planetary gear set 2, or the carrier 3C and ring gear 3R of the third planetary gear set 3. Referring to the ring gear 3R of the third planetary gear set 3, the one-way engaging means is permitted to be interposed between the ring gear 3R and any other element (including the input shaft 4) except the casing 6. Then, referring to the carrier 3C of the third planetary gear set 3, the one-way engaging means is permitted to be interposed between the carrier 3C and any other element (including the input shaft 4) except the casing 6, the ring gear 2R of the second planetary gear set 2 and the carrier 1C of the first planetary gear set 1.

Further, referring to how to use the one-way engaging means, the specifications and drawings attached to the applications of Japanese Patent Application Nos. 63-176270 and 63-221670 (laid-open Nos. 2-26350 and 2-72245) which have been already applied by the present applicant are utilized. An improvement of the engaging means will be shown as follows.

Figure 8:
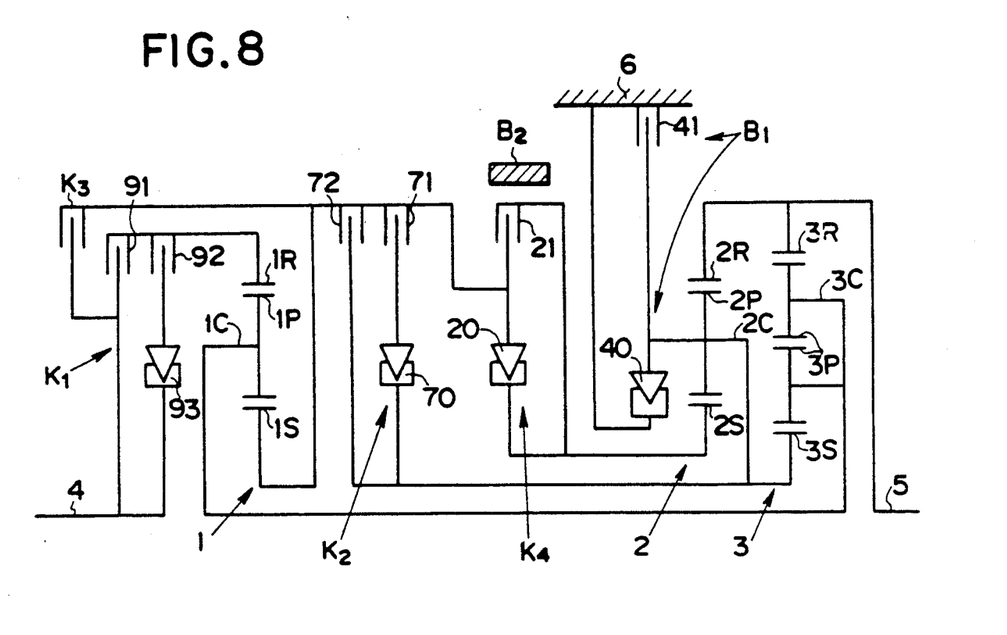

The embodiment shown in FIG. 8 is similar to that shown in FIG. 5, except that the first clutch means K1 is constituted of a multi-disc clutch 91, another multi-disc clutch 92 disposed in parallel relationship with the multi-disc clutch 91 and a one-way clutch 93 disposed in series relationship with the multi-disc clutch 92 and permitting the transmission of torque from the input shaft 4, the second clutch means K2 is constituted of a one-way clutch 70, a multi-disc clutch 71 disposed in series relationship with the one-way clutch 70, and another multi-disc clutch 72 disposed in parallel relationship with the combination of the one-way clutch 70 and the multi-disc clutch 71, the fourth clutch means K4 is constituted of a one-way clutch 20 and a multi-disc clutch 21 disposed in parallel relationship with the one-way clutch 20, the first brake means B1 is constituted of a one-way clutch 40 and a multi-disc brake 41 disposed in parallel relationship with the one-way clutch 40, and the second brake means B2 is constituted of a band brake. Table 6 shows the operation of the automatic transmission in accordance with the embodiment shown in FIG. 8. On the table, the mark ○ represents the engaged condition, and the mark X represents the released condition, similarly to the aforementioned tables. In addition, in the following table, the mark ⊙ represents the engaged condition in engine brake. Further, a, b, c . . . in the columns showing the gear represent the combination of other engaged and released conditions to set the corresponding gear. In the performance of the gear change, the combination of the engaged and released conditions may be changed in the order of the symbols or any combination of the engaged and released conditions may be selected.

TABLE 6

| | clutch means | | | | | | | | brake means | | |
|---|---|---|---|---|---|---|---|---|---|---|---|
| | K1 | | | K2 | | | | K4 | B1 | | |
| | 91 | 92 | 93 | 72 | 71 | 70 | K3 | 21 | 20 | 40 | 41 | B2 |
| 1st | ⊙ | ○ | ○ | X | X | X | X | ⊙ | ○ | ⊙ | ○ | X |
| 2nd | ⊙ | ○ | ○ | ⊙ | ○ | ○ | X | X | X | ⊙ | ○ | X |
| 3rd | ⊙ | ○ | ○ | X | ○ | ○ | ○ | X | X | ⊙ | ○ | X |
| 4th | ⊙ | ○ | ○ | ○ | ○ | X | ○ | X | X | X | X | X |
| 5th | X | ○ | X | ○ | ○ | X | ○ | X | X | X | ○ | X |
| Rev | X | X | X | X | X | X | ○ | ○ | ○ | X | X | X |
| 2.5th | ⊙ | ○ | ○ | X | ○ | X | ⊙ | ⊙ | ○ | X | X | ○ |
| 3.5th | ⊙ | ○ | ○ | X | ○ | X | ○ | X | X | X | X | ○ |

Figure 9:
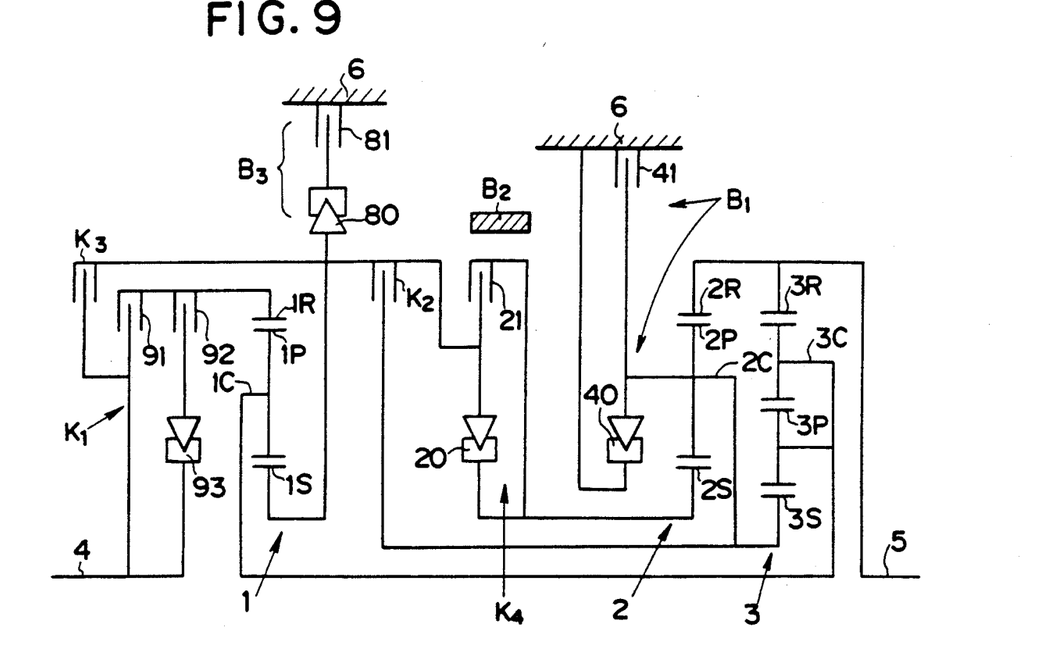

The embodiment shown in FIG. 9 is similar to that shown in FIG. 8, except that third brake means B3 is additionally provided, and constituted of a one-way clutch 80 and a multi-disc brake 81 disposed in series relationship with the one-way clutch 80. Table 7 shows the operation of the embodiment shown in FIG. 9.

TABLE 7

| | clutch means | | | | | brake means | | | | | |
|---|---|---|---|---|---|---|---|---|---|---|---|
| | K1 | | | | | K4 | B1 | | | B3 | |
| | 91 | 92 | 93 | K2 | K3 | 21 | 20 | 40 | 41 | B2 | 81 | 80 |
| 1st | ⊙ | ○ | ○ | X | X | ⊙ | ○ | ⊙ | ○ | X | X | X |
| 2nd | ⊙ | ○ | ○ | ⊙ | X | X | X | ⊙ | ○ | X | ○ | ○ |
| 3rd | ⊙ | ○ | ○ | X | ○ | X | X | ⊙ | ○ | X | ○ | X |
| 4th | ⊙ | ○ | ○ | ○ | ○ | X | X | X | X | X | ○ | X |
| 5th | X | X | X | ○ | ○ | X | X | X | X | ○ | ○ | X |
| Rev | X | X | X | X | ○ | ○ | X | ○ | X | X | X | X |
| 2.5th | ⊙ | ○ | ○ | X | X | ⊙ | X | X | X | ○ | ○ | ○ |
| 3.5th | ⊙ | ○ | ○ | X | ○ | X | X | X | X | ○ | ○ | X |

Figure 10:
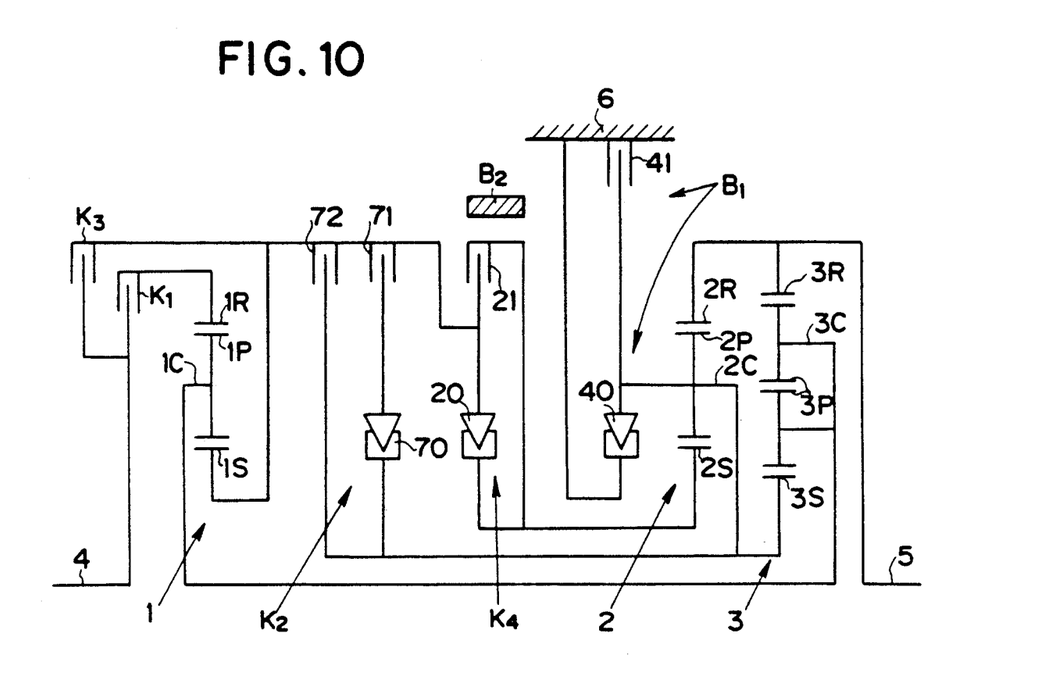

The embodiment shown in FIG. 10 is similar to that shown in FIG. 8, except that the first clutch means K1 is constituted of a single multi-disc clutch. Table 8 shows the operation of the embodiment of FIG. 10.

TABLE 8

| | clutch means | | | | | | brake means | | |
|---|---|---|---|---|---|---|---|---|---|
| | K1 | K2 | | | K3 | K4 | | B1 | |
| | | 72 | 71 | 70 | | 21 | 20 | 40 | 41 | B2 |
| 1st | ○ | X | X | X | X | ⊙ | ○ | ⊙ | ○ | X |
| 2nd | ○ | ⊙ | ○ | ○ | X | X | X | ⊙ | ○ | X |
| 3rd | ○ | X | ○ | ○ | ○ | X | X | ⊙ | ○ | X |
| 4th | | | | | | | | | | |
| a | ○ | ○ | ○ | X | ○ | X | X | X | X | X |
| b | X | ○ | ○ | X | ○ | ⊙ | ○ | X | X | X |
| 5th | X | ○ | ○ | X | ○ | X | X | X | X | ○ |
| Rev | X | X | X | X | ○ | ○ | X | ○ | X | X |
| 2.5th | ○ | X | ○ | X | X | ⊙ | ○ | X | X | ○ |
| 3.5th | ○ | X | ○ | X | ○ | X | X | X | X | ○ |

Figure 11:
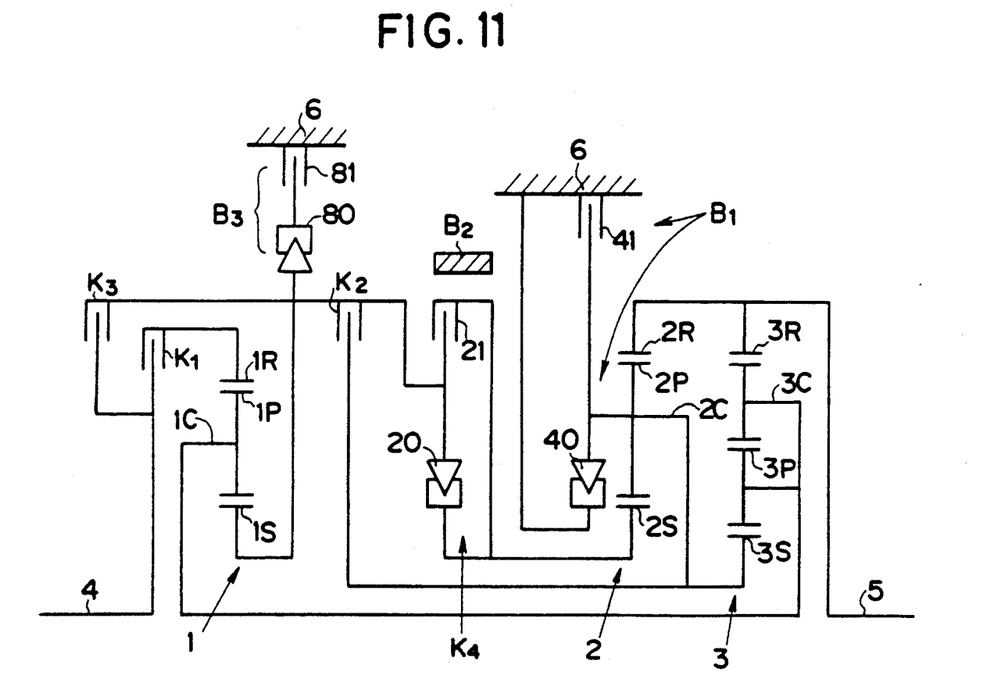

The embodiment shown in FIG. 11 is similar to that shown in FIG. 9, except that the first clutch means K1 is constituted of a single multi-disc clutch. Table 9 shows the operation of the embodiment of FIG. 11.

TABLE 9

| | clutch means | | | | | brake means | | | | |
|---|---|---|---|---|---|---|---|---|---|---|
| | K1 | K2 | K3 | K4 | | B1 | | | B3 | |
| | | | | 21 | 20 | 40 | 41 | B2 | 81 | 80 |
| 1st | ○ | X | X | ⊙ | ○ | ⊙ | ○ | X | X | X |
| 2nd | ○ | ⊙ | X | X | X | ⊙ | ○ | X | ○ | ○ |

TABLE 9-continued

| | clutch means | | | | | brake means | | | | |
|---|---|---|---|---|---|---|---|---|---|---|
| | K1 | K2 | K3 | K4 | | B1 | | | B3 | |
| | | | | 21 | 20 | 40 | 41 | B2 | 81 | 80 |
| 3rd | ○ | X | ○ | X | X | ⊙ | ○ | X | ○ | X |
| 4th | | | | | | | | | | |
| a | ○ | ○ | ○ | X | X | X | X | ○ | ○ | X |
| b | X | ○ | ○ | ⊙ | ○ | X | X | X | ○ | X |
| 5th | X | ○ | ○ | X | X | X | X | ○ | ○ | X |
| Rev | X | X | ○ | ○ | X | ○ | X | X | X | X |
| 2.5th | ○ | X | X | ⊙ | ○ | X | X | ○ | ○ | X |
| 3.5th | ○ | X | ○ | X | X | X | X | ○ | ○ | X |

Figure 12:
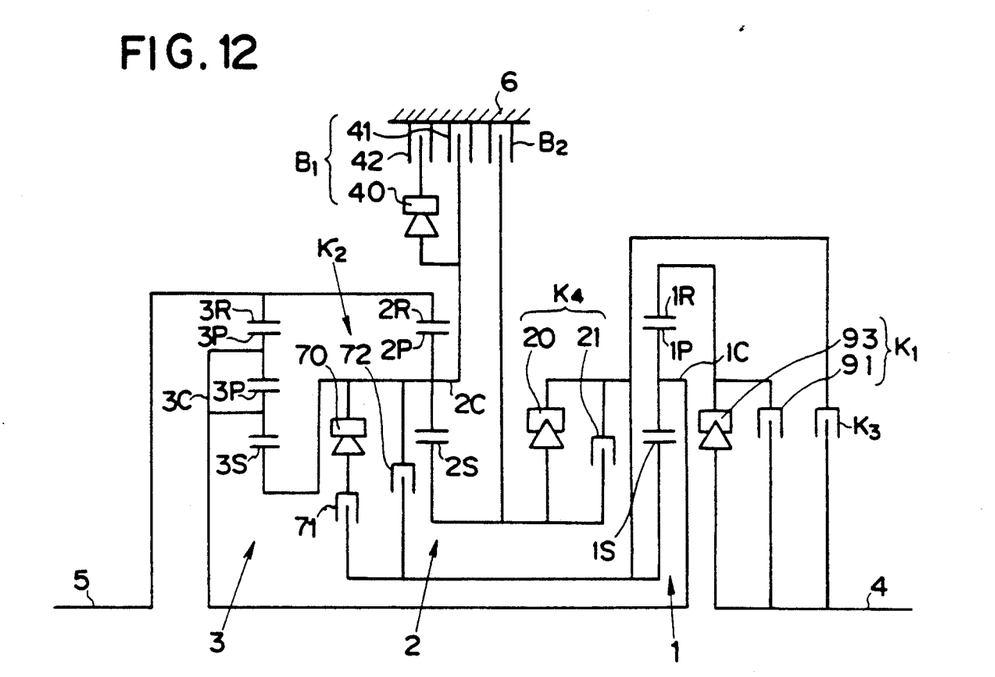
Figure 13:
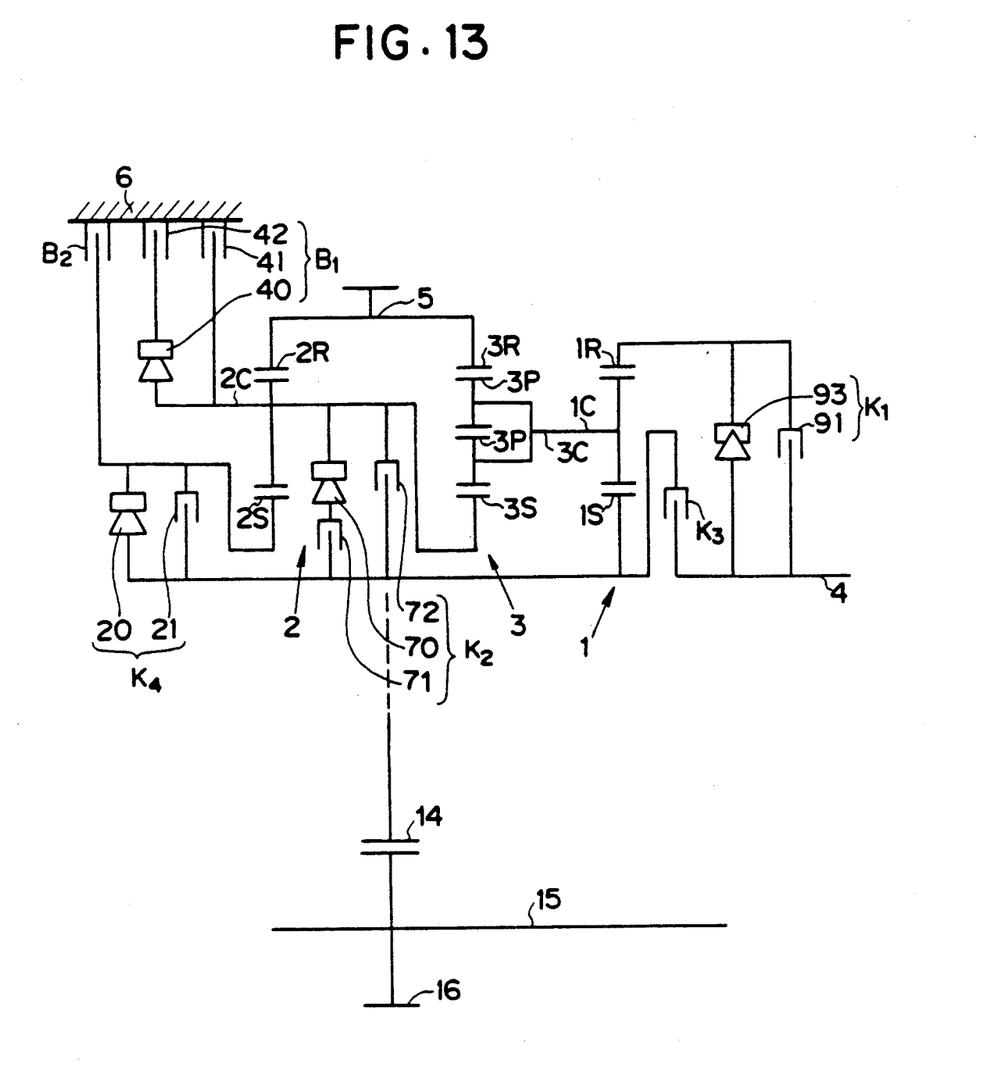

According to the embodiment shown in FIG. 12, the first clutch means K1 is constituted of the one-way clutch 93 capable of transmitting the torque to the ring gear 1R of the first planetary gear set 1, and the multi-disc clutch 91 disposed in parallel relationship with the one-way clutch 93, the second clutch means K2 is constituted of the one-way clutch 70 which is engaged when the sun gear 1S of the first planetary gear set 1 intends to rotate in the reverse direction to the carrier 2C of the second planetary gear set 2 and the sun gear 3S of the third planetary gear set 3, the multiple disc clutch 71 disposed in series relationship with the one-way clutch 70, and another multi-disc clutch 72 disposed in parallel relationship with the combination of the one-way clutch 70 and the multiple disc clutch 71, the fourth clutch means K4 is constituted of the one-way clutch 20 which is engaged when the sun gear 1S of the first planetary gear set 1 intends to rotate in the reverse direction to the sun gear 2S of the second planetary gear set 2, and the multi-disc clutch 21 disposed in parallel relationship with the one-way clutch 20, the first brake means B1 is constituted of the one-way clutch 40 which is engaged when the carrier 2C of the second planetary gear set 2 intends to rotate in the reverse direction, the multi-disc brake 42 disposed in series relationship with the one-way clutch 40, and another multiple disc brake 41 disposed in parallel to the combination of the one-way clutch 40 and the multi-disc brake 42. The embodiment shown in FIG. 13 is so constituted to vary the arrangement of the gear train such that the embodiment shown in FIG. 12 is made to be suitable for the FF car. Also, in the embodiment shown in FIG. 13, the cylindrical shaft connecting the ring gear 2R of the second planetary gear set 2 to the ring gear 3R of the third planetary gear set 3 is used as the output shaft 5, and the counter drive gear 14 is mounted on the outer periphery of the cylindrical shaft is meshed with the counter driven gear 16 mounted on the counter shaft 15. The automatic transmission in accordance with the embodiments shown in FIGS. 12 and 13 permits to set the five forward speeds and one reverse, similarly to the above mentioned embodiments, and further improves the silence property and the fuel consumption, or alleviate the shocks. Table 10 shows the operation of the embodiments shown in FIG. 12 and 13.

TABLE 10

| | clutch means | | | | | | | | brake means | | |
|---|---|---|---|---|---|---|---|---|---|---|---|
| | K1 | | | K2 | | | K4 | | B1 | | |
| | 93 | 91 | K3 | 70 | 71 | 72 | 20 | 21 | 40 | 42 | 41 | B2 |
| 1st | ○ | ⊙ | X | X | X | X | ○ | ⊙ | ○ | ○ | ○ | X |
| 2nd | ○ | ⊙ | X | ○ | ○ | ○ | X | X | ○ | ○ | ⊙ | X |
| 3rd | ○ | ⊙ | ○ | X | ○ | X | X | X | ○ | ○ | ⊙ | X |
| 4th | ○ | ⊙ | ○ | X | ○ | ○ | X | X | X | X | X | X |

TABLE 10-continued

| | clutch means | | | | | | | | brake means | | | |
|---|---|---|---|---|---|---|---|---|---|---|---|---|
| | K1 | | | K2 | | | K4 | | B1 | | | |
| | 93 | 91 | K3 | 70 | 71 | 72 | 20 | 21 | 40 | 42 | 41 | B2 |
| 5th | X | X | O | X | O | O | X | X | X | X | X | O |
| Rev | X | X | O | X | X | X | X | O | X | X | X | X |

Though the first to thirteenth embodiments of the present invention have been heretofore described, it is a matter of course that the present invention is not limited to these embodiments. The connection of the elements themselves in the respective planetary gear set will do either in the normal connection or in the selective connection through engaging means such as a clutch. Further, the elements for interconnecting the input and output shafts and those to be held stationary are permitted to the properly determined, if necessary. Also, in the present invention, the one-way engaging means such as one-way clutch may be employed for either the clutch means or brake means or a plurality of clutch means or brake means.

Hereinafter will be described the advantages obtained in accordance with the present invention. In the automatic transmission of the present invention, since the input torque is not loaded to only either one of the sun gears in order to set the predetermined gear, the diameter of the sun gear does not need to be enlarged for maintaining the strength. Therefore, the automatic transmission of the present invention reduces the outer diameter of not only the particular planetary gear set, but also the whole automatic transmission, and obtains the excellent durability. Further, the automatic transmission of the present invention is free from the power circulation in all gears, so that the transmitting efficiency of torque is good. Furthermore, since the gear change is executed by changing over the engaged and released conditions of two engaging means, the control for gear change is facilitated, and the shocks in gear change are reduced.

What is claimed is:

1. An automatic transmission for changing the rotational speed of an input shaft to transmit the resultant rotation to an output shaft through a gear train including of a plurality of planetary gear sets, comprising:
 a single pinion type first planetary gear set provided with a first sun gear, a first ring gear, and a first carrier for holding a pinion gear meshing with said first sun gear and said first ring gear;
 a single pinion type second planetary gear set provided with a second sun gear normally or selectively connected to said first sun gear, a second ring gear, and a second carrier for holding a pinion gear meshing with said second sun gear and said second ring gear; and
 a double pinion type third planetary gear set provided with a third sun gear normally or selectively connected to said second carrier, a third ring gear normally or selectively connected to said second ring gear, and a third carrier for holding an inner pinion gear meshing with said third sun gear and an outer pinion gear meshing with said inner pinion gear and said third ring gear and normally or selectively connected to said first carrier.

2. An automatic transmission according to claim 1, further comprising first clutch means for selectively interconnecting said input shaft and said first ring gear, second clutch means for selectively interconnecting said first sun gear and said second carrier, third clutch means for selectively interconnecting said input shaft and said first sun gear, fourth clutch means for selectively interconnecting said first sun gear and said second sun gear, first brake means for selectively stopping the rotation of at least said second carrier out of said second carrier and said third sun gear, and second brake means for selectively stopping the rotation of said second sun gear, and said output shaft is connected to at least one of said second ring gear and said third ring gear and capable of setting at least five forward speeds and one reverse.

3. An automatic transmission according to claim 2, further comprising fifth clutch means for selectively interconnecting the said input shaft and said second sun gear.

4. An automatic transmission according to claim 2, further comprising sixth clutch means for selectively interconnecting said first carrier and said third carrier.

5. An automatic transmission according to claim 2, further comprising seventh clutch means for selectively interconnecting said second ring gear and said third ring gear, and said output shaft is connected to said third ring gear.

6. An automatic transmission according to claim 2, further comprising third brake means for selectively stopping the rotation of said first sun gear.

7. An automatic transmission according to claim 4, further comprising third brake means for selectively stopping the rotation of said first sun gear.

8. An automatic transmission according to claim 5, further comprising third brake means for selectively stopping the rotation of said first sun gear.

9. An automatic transmission according to claim 2, wherein said input shaft and said output shaft are disposed on to identical axis, and the first, second and third planetary gear sets are arranged between said input shaft and said output shaft in the mentioned order from the input shaft side and on the identical axis.

10. An automatic transmission according to claim 9, wherein the first and third clutch means are disposed on the input shaft side from said first planetary gear set, the fourth clutch means is disposed between said first and second planetary gear sets, and the second clutch means is disposed between said second and third planetary gear sets.

11. An automatic transmission according to claim 9, wherein the first and third clutch means are disposed on the input shaft side from said first planetary gear set, and the second and fourth clutch means are disposed between said first and second planetary gear sets in the mentioned order from the first planetary gear set side.

12. An automatic transmission according to claim 9, further comprising a counter shaft disposed in parallel to said output shaft, a drive gear mounted on said output shaft, and a driven gear meshing with said drive gear and mounted on said counter shaft.

13. An automatic transmission according to claim 2, wherein said first, second and third planetary gear sets are arranged on an identical axis with a center axis of the input shaft in the mentioned order, and said output shaft is a cylindrical shaft connected to said second and third ring gears, and disposed on the outer peripheral side of said ring gears.

14. An automatic transmission according to claim 13, further comprising a counter shaft disposed in parallel to said axis on which the planetary gear sets are arranged, a drive sprocket mounted on said output shaft, a driven sprocket mounted on said counter shaft, and a chain wound around said drive sprocket and said driven sprocket.

15. An automatic transmission according to claim 2, wherein a plurality of types of combination patterns of the clutch means and the brake means to be engaged are provided to set at least any one of gears.

16. An automatic transmission according to claim 2, wherein said first clutch means includes of a single multi disc clutch.

17. An automatic transmission according to claim 2, wherein said first clutch means includes of a one-way clutch and a multi disc clutch arranged in parallel relationship to each other between s<id input shaft and said first ring gear.

18. An automatic transmission according to claim 2, wherein said first clutch means includes of a one-way clutch and a multiple disc clutch disposed in series relationship to each other between said input shaft and said first ring gear, and another multi-disc clutch disposed in parallel relationship to said one-way clutch and said multi-disc clutch.

19. An automatic transmission according to claim 2, wherein said second clutch means includes of a single multi-disc clutch.

20. An automatic transmission according to claim 2, wherein said second clutch means includes of a one-way clutch and a multi-disc clutch disposed in series relationship to each other between said first and second sun gears, and another multi-disc clutch disposed in parallel relationship to said one-way clutch and said multi-disc clutch.

21. An automatic transmission according to claim 2, wherein said third clutch means includes of a single multi-disc clutch.

22. An automatic transmission according to claim 2, wherein said fourth clutch means includes of a single multi-disc clutch.

23. An automatic transmission according to claim 2, wherein said fourth clutch means includes of a one-way clutch and a multi-disc clutch disposed in parallel relationship to each other between said first and second sun gears.

24. An automatic transmission according to claim 2, wherein said first brake means includes of a single multi-disc brake.

25. An automatic transmission according to claim 2, further comprising a casing for accommodating said gear train, and said first brake means includes of a one-way clutch and a multi-disc brake disposed in parallel relationship to each other between said casing and said second carrier.

26. An automatic transmission according to claim 2, further comprising a casing for accommodating said gear train, and said first brake means includes of a one-way clutch and a multi-disc brake disposed in series relationship to each other between said casing and said second carrier, and another multi-disc brake disposed in parallel relationship to said one-way clutch and said multi-disc brake.

27. An automatic transmission according to claim 2, wherein said second brake means includes of a single multi-disc brake.

28. A automatic transmission according to claim 2, wherein said second brake means includes of a band brake.

29. An automatic transmission according to claim 6, wherein said third brake means includes of a single multi-disc brake.

30. An automatic transmission according to claim 6, further comprising a casing for accommodating said gear train, and said third brake means includes of a one-way clutch and a multi-disc brake disposed in series to each other between said first sun gear and said casing.

* * * * *

UNITED STATES PATENT AND TRADEMARK OFFICE
CERTIFICATE OF CORRECTION

PATENT NO. : 5,057,063

DATED : October 15, 1991

INVENTOR(S) : ASADA, et al.

It is certified that error appears in the above-identified patent and that said Letters Patent is hereby corrected as shown below:

Columns 21-22:

Claims 16, 17, 18, 19, 20, 21, 22, 23, 24, 27, 28 and 29, line 2 of each, after "includes", delete "of".

Claim 17, line 3, change "multi disc" to -- multi-disc --;
line 4, change "s<id" to -- said --.

Claims 25, 26 and 30, line 3 of each, after "includes", delete "of".

Signed and Sealed this

Twenty-sixth Day of April, 1994

*Attest:*

BRUCE LEHMAN

*Attesting Officer*   Commissioner of Patents and Trademarks